United States Patent [19]

Kromrey

[11] Patent Number: 4,662,964

[45] Date of Patent: May 5, 1987

[54] METHOD FOR MAKING A RIB-REINFORCED ABLATIVE THERMAL BARRIER

[75] Inventor: Robert V. Kromrey, Campbell, Calif.

[73] Assignee: United Technologies Corporation, Hartford, Conn.

[21] Appl. No.: 698,490

[22] Filed: Feb. 5, 1985

[51] Int. Cl.⁴ .......................... B32B 3/30; B32B 31/06
[52] U.S. Cl. .................................... 156/184; 156/191; 156/215; 156/242; 156/245; 156/293; 156/304.1; 156/304.3; 156/306.6; 156/306.9; 428/167; 428/182; 428/222
[58] Field of Search ............... 156/184, 185, 186, 187, 156/189, 191, 192, 194, 215, 242, 245, 293, 294, 306.6, 306.9, 313, 304.3, 304.5, 304.1, 258; 428/36, 167, 182, 222

[56] References Cited

U.S. PATENT DOCUMENTS

| | | | |
|---|---|---|---|
| 2,703,299 | 3/1955 | Seymour et al. | 156/258 |
| 3,769,118 | 10/1973 | Tariel et al. | 156/304.1 |
| 3,770,555 | 11/1973 | Gladston et al. | 156/306.9 |
| 3,991,243 | 11/1976 | Biddell | 156/306.9 |
| 4,448,742 | 5/1984 | Kromrey | 264/310 |
| 4,456,496 | 6/1984 | Suter et al. | 156/306.9 |

Primary Examiner—Caleb Weston
Attorney, Agent, or Firm—Harry J. Gwinnell; C. G. Nessler

[57] ABSTRACT

An ablative thermal barrier on the interior surface of a cylindrical combustor is made by first molding a silicone rubber strip with shaped edges. The strip is then laid inside the combustor so that it runs circumferentially either as a helix or as a series of circles. The adjacent turns are spaced apart by a gap into which is interposed a thermosetting polymer material. The rubber is then pressed radially outward so that the adjacent turns are caused to press laterally against each other. The thermosetting material is then cured while in its resultant compressed condition, to make the material into a circular or helical rib which better retains the rubber in place during use.

7 Claims, 5 Drawing Figures

METHOD FOR MAKING A RIB-REINFORCED ABLATIVE THERMAL BARRIER

TECHNICAL FIELD

The present invention relates to the method of adhering to the surface of an article a combination of two polymer materials, and in particular to the making of reinforced thermal barriers of the ablative type on the interior of a cylindrical vessel, such as a ramjet combustor.

BACKGROUND

The present invention is related to co-pending application Ser. No. 698,723 "Reinforced Ablative Thermal Barriers" filed on even date hereof by the same applicant. As disclosed in the co-pending application, retention of certain kinds of thermal barriers on the surface of articles to be protected is improved when a folded and extensible member is included within the ablative material. In particular, the adhesion of a silicone rubber type of material to the interior of a cylindrical combustor is improved substantially when a fiber reinforced polymer rib is run helically along the interior of the combustor with a relatively close pitch. The rib is attached to the case by a resin bond and the rubber fills the space between the rib turns.

In the basic concept of the invention, the ribs can be made of any material which does not swell as does the elastomer material. And the material must be sufficiently strong and resistant to thermal degradation to carry out the intended function of holding the swelling material to the surface to be protected. In the preferred practice of the invention the rib is folded or corrugated so that when swelling occurs the rib will tend to elongate radially inward, drawing the rib with it. It is found that the compliance of the rib is particularly effective in retaining the primary protective function of the silicone rubber. The rib is relatively small in its cross sectional area which is exposed to the interior combustor gases. Typically it will be about 0.4-10 mm wide.

The rib runs circumferentially around the interior of the combustor; it may run circularly or helically, with the latter preferred. With a helical combustor, it will be appreciated that the rib and rubber strip contained between adjacent turns both constitute continuous members running in a helical path down the length of the combustor. In either design, one way of making the thermal barrier invention is to prefabricate a rib shape, adhere it to the inside wall of the combustor, and then flow silicone rubber into place and cure it. This approach involves complications in accurately and adequately positioning the rib in place. Thus, the present invention reflects attempts to improve the manufacture of combustors of the type described.

DISCLOSURE OF THE INVENTION

An object of the invention is to more easily and better adhere elastomer type ablative materials to the surfaces they are to protect. A further object of the invention is to ease the manufacture and placement of ribs which are corrugated or folded, i.e., those which have a shape which adapts them to extending themselves from the surface when force is applied. A particular object of the invention is to manufacture thermal barrier lined combustors having circumferentially running ribs, either circular or helical, and where the ribs are of a material which is relatively dimensionally stable compared to another ablative surface protective material which comprises the bulk of the thermal barrier.

According to the invention, an ablative material, in particular an elastomer, is adhered to the surface of an article by a rib which is cured in situ. Adjacent pieces of elastomer are molded so that when they are spaced apart, the adjacent edges define a space having generally the shape of the desired rib. Material which is interposed into the space, such as resin impregnated fabric, is molded and hardened while the elastomer is pushed together.

In the preferred use of the invention, a helical rib is formed along the interior of a cylindrical combustor by wrapping a previously formed silicone rubber strip as a helix along the outside diameter of an expandable mandrel. The compliant fabric of an L-shaped rib is simultaneously interposed between the adjacent turns of the rubber. The mandrel is placed inside the bore of the combustor, so that the outside diameter of the rubber and fabric on the mandrel fits closely to the inside diameter of the combustor. Then, the mandrel is expanded radially outward. This compresses the rubber and causes it to press tightly against the case diameter and to also expand longitudinally, thus compressing the adjacent turns of the rubber together (the very ends being retained by other structure). The mandrel expansion force is maintained while heat is applied to cause the resin to set and the ribs to thereby become rigid. Then, the mandrel can be collapsed and removed.

The principles of the invention are most applicable to ribs which run in circumferential fashion around the inside of the combustor as well. It should also be evident that the principles of the invention can be applied in reverse fashion by pressing on the exterior of a structure by suitable means. An advantage of the invention is that it conveniently forms a complex shaped rib in place with good density and excellent fit between the rubber and the rib.

The foregoing and other objects, features and advantage of the present invention will become more apparent from the following description of preferred embodiments and accompanying drawings.

BRIEF DESCRIPTION OF THE DRAWINGS

FIG. 6 shows how a previously molded rubber strip is wound around the outside diameter of an expandable mandrel together with the strip material, and how the mandrel is able to be inserted inside a combustor. BEST MODE FOR CARRYING OUT THE INVENTION FIG. 1 shows a partial longitudinal cross section of a combustor 20, or cylindrical vessel, having a helical rib 22 running around its interior. This combustor is described in the co-pending application, the disclosure of which is hereby incorporated by reference. Between the ribs 22 is an elastomer material 24 such as Dow Corning DC 93-104 (Dow Corning, Midland, Michigan). The rib 22 is preferably made of a silica glass or other ceramic material fabric, impregnated with a high temperature epoxy, polyimide, phenolic or other resin. I prefer bis-maleimide. The rib cross section has roughly the shape of the letter W, being corrugated. When the elastomer surface 25 is subjected to a high heat flux, it goes through various stages of degradation, finally ending up as a cracked char. One of the stages involves volumetric expansion of the material and the corrugated rib is adapted to cope with this phenomenon. In particular, the rib will extend radially inward with the expanding silicone rubber material. In doing so, the silicone rubber is particularly kept in contact with the case wall 26 which it is intended to protect.

The ribs are relatively thin in thickness as shown in the Figure, compared to the thickness of the silicone rubber. By way of example, the ribs may have a thickness of about 0.4–0.7 mm and be spaced apart about 10 mm, which is of course the width of the silicone rubber. The radial thickness T of a typical protective layer will be about 12 mm.

Figure 1:
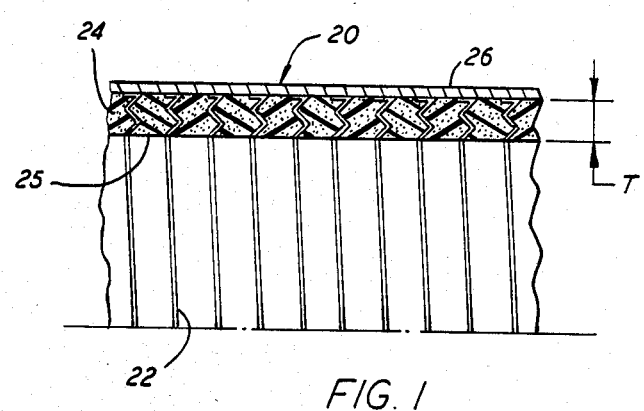
FIG. 1 shows a partial cross section of a combustor having a folded and extensible rib running helically around its interior to retain an ablative elastomer.
Figure 2:
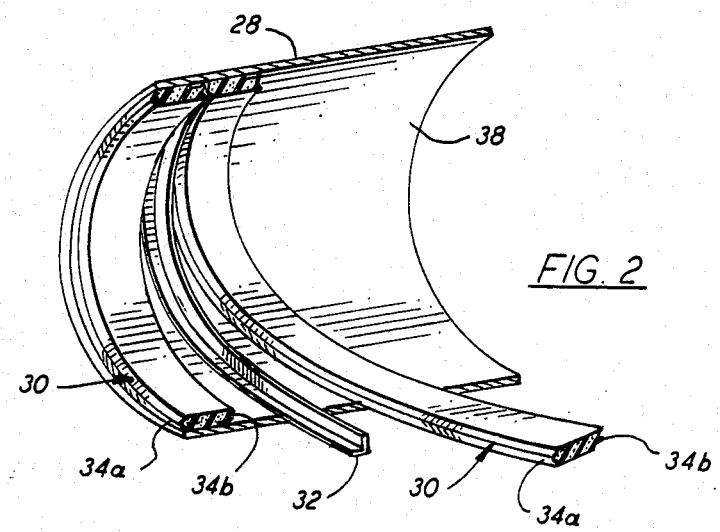
FIG. 2 shows how a previously formed rubber strip is laid in the interior of a combustor to capture between adjacent turns a resin impregnated rib fabric.
Figure 3:
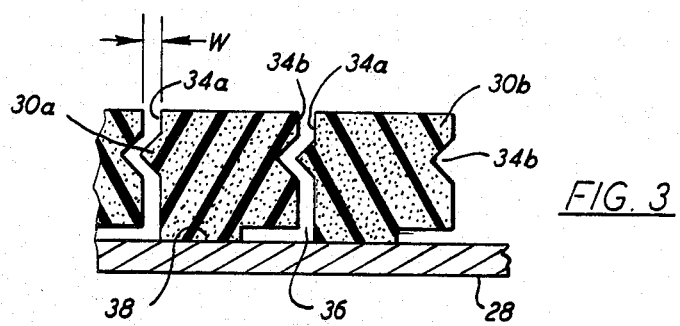
FIG. 3 shows in cross section a helical rib lying on the interior surface of a combustor so that the space between adjacent strips defines the configuration of the rib.

FIGS. 2 and 3 show the general concept of the present invention. A strip of rubber 30 is molded in a mold which is not shown here. Metal molds and techniques commonly associated with rubber molding may be used. The mold gives the strip opposing edges 34a, 34b so that when the strip is laid inside the bore of the metal combustor case 28 and when the adjacent turns are slightly spaced apart, the space 36 between the opposing faces 34a, 34b defines the shape of the rib which is desired, as shown in FIG. 3. Simultaneously with the laying in place of the rubber, an uncured thermosetting resin impregnated piece of fabric 32, such as a tape, is interposed between the turns as shown in FIG. 2. As described below, this is the preferred way of construction, but it is also within contemplation that the simpler shapes of ribs and for other compositions of rib construction, the strip 30 may be first laid in place and then the rib material may be infiltrated afterwards into the space 36.

Once the rib material is put in place, the shape and width W of the rib is better defined by pushing the adjacent turns axially so that the opposing faces 34a, 34b move toward each other and compress the rib material. Under such condition the rib is caused to set, such as by applying heat to the entire structure. Usually, a resin compatible with the resin of the rib will be placed on the interior combustor surface 38 to cause the rubber strip to adhere to the surface as well.

Figure 4:
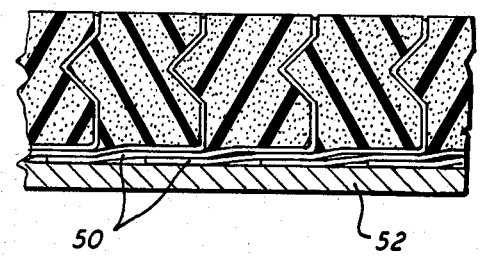
FIG. 4 shows a preferred rib configuration, illustrating how there is substantial overlap in the portion of the L-shaped rib which is adjacent the wall of the combustor.
Figure 5:
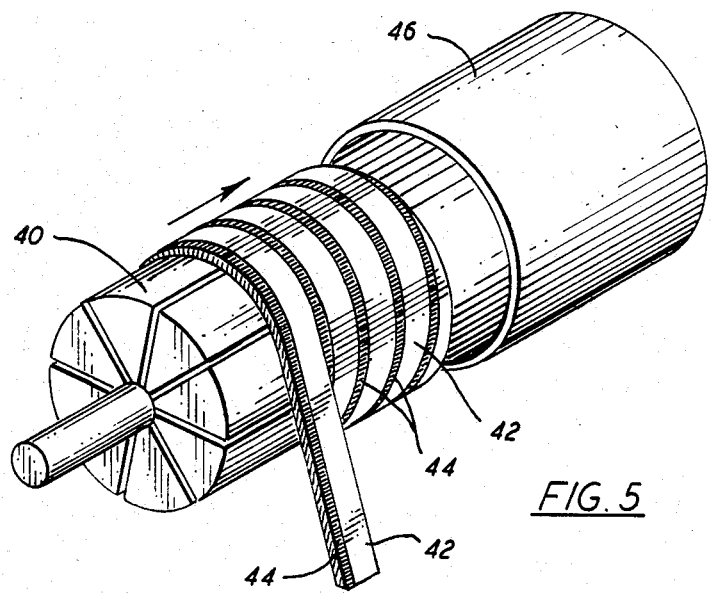

It is much easier to make the structure just described if the strip is first wound on the exterior diameter of a mandrel 40 as shown in FIG. 5. The impregnated fabric 44 of the rib is carefully laid along one edge of the strip 42 as it is wound around the outside diameter of the mandrel. As described below, this technique is particularly suitable for the L-shape rib which is shown and discussed in connection with FIG. 4. (In FIG. 5, the more rudimentary L-shaped rib in FIG. 3 is illustrated, to enable better illustration of the technique than would be provided by the more preferred shape shown in FIG. 4.) The fabric of the rib is chosen as one having good drape, i.e., the propensity to conform to an irregular shape without excessive rumpling and the like. A satin weave often works well. The mandrel is sized so that when the combination of rubber and rib fabric is wound around the outside diameter, the outside diameter of the resultant assembly is slightly smaller than the inside diameter of the combustor 46 which is being fabricated. Then, the mandrel with the material on its surface is inserted inside the bore of the combustor and the mandrel is caused to expand. Expanding mandrels of the mechanical (segmented type) and of the bladder type are common and may be employed. Not shown in the Figure is that there will be rings at either end of the bore, either incorporated into the case or as part of the mandrel, to prevent substantial axial movement of the rubber. Thus, upon the expansion of the mandrel, the rubber is pressed outwardly against the case interior. Owing to the compressibility of the rubber, there is a lateral or longitudinal compression as well. This closes the axial space where the rib fabric lies, tightly compressing the fabric between adjacent turns of the rubber. Curing is caused while the compressive action is sustained. When the resin of the rib is cured and set, the pressure of the mandrel is released and the mandrel is withdrawn. By such a procedure, it will be found that very sound ribs, shaped according to the definition of the edges of the rubber piece or pieces, will be formed.

FIG. 4 shows the more preferred shape of the rib where the portion 50 of the rib adjacent the case 52 is long enough to overlap 1–4 adjacent turns of the rib. By making the rib so that it will overlap at last one adjacent turn, the material which is adhered against the interior of the combustor will be entirely of rib material. Not only does this configuration add to the integrity of the rib structure, but the resin in the rib will cause adhesion of the silicone rubber to the rib and of the rib to the case.

The invention is pertinent not only to the forming of the preferred helical rib and silicone rubber strip, but to formation of circular ribs as well. As the term is used herein, circumferential rib is meant to embrace both helical and circular ribs. Conceivably, the invention can also be employed with a non-elastomer strip and the adjacent turns need not move toward one another during forming and curing of the rib. But as a practical matter, the best practice of the invention requires that both the strip and the rib material be compliant and functionally compressible when they are put in place prior to curing of the rib, because it is this aspect which enable the sure achievement of good density and strength of the rib.

The principles of the invention are applicable to other configurations than those described. In particular, the rib or ribs do not need to be continuous but may comprise smaller discontinuous segments. The invention may also be applied to the manufacture of thermal barriers on external surfaces and flat surfaces. Fixtures which are useful in such applications will be those evident from other compressive molding processes, taking into account the teachings herein. Although this invention has been shown and described with respect to a preferred embodiment, it will be understood by those skilled in the art that various changes in form and detail thereof may be made without departing from the spirit and scope of the claimed invention.

I claim:

1. A method of forming an ablative thermal barrier made up of strips of a first polymer containing material and a rib of a second polymer containing material which aids in holding the first material in place on the interior surface of a hollow cylindrical vessel comprising molding the first polymer material into a form such that when the strips of the first material are placed adjacent to one another on a surface the opposing edges thereof define a space;

placing the strips of the first material circumferentially in alternating turns with the second material on the surfaces so that the edges thereof define a space which is generally the shape of an unformed rib made up of the second material;

curing the polymer material to form the rib and simultaneously adhering the second polymer material to the surface.

2. The method of claim 1 wherein the rib runs helically, characterized by laying the strip as a helix running along the interior wall.

3. The method of claim 1 characterized by a first polymer which is an elastomer and a second polymer which is thermosetting.

4. The method of claim 3 characterized by a first polymer which is silicone rubber and a second polymer which contains a ceramic fabric.

5. The method of claim 1 characterized by forming the second polymer material in an L-shape so that the base of the L rests against the interior of the vessel.

6. The method of claim 1 characterized by placing both materials on the exterior of a mandrel; placing the mandrel next to the article using the mandrel to force the materials against the article surface so the first polymer material moves laterally against itself to thereby compress and define the second polymer material while it is curing.

7. The method of claim 6 wherein the article is a hollow cylindrical vessel and wherein the mandrel is inserted within the vessel and forces the first material against the inside surface of the vessel by expanding radially outwardly.

* * * * *